Oct. 20, 1970     L. B. BOURGEAULT     3,535,589

UNBALANCED LOAD PROTECTION CIRCUIT FOR AC GENERATOR

Filed Oct. 18, 1966

INVENTOR.
LEO B. BOURGEAULT
BY
ATTORNEY

United States Patent Office 3,535,589
Patented Oct. 20, 1970

3,535,589
UNBALANCED LOAD PROTECTION CIRCUIT
FOR AC GENERATOR
Leo B. Bourgeault, Spring Lake Heights, N.J., assignor to The Bendix Corporation, Eatontown, N.J., a corporation of Delaware
Filed Oct. 18, 1966, Ser. No. 587,498
Int. Cl. H02h 3/28, 7/06
U.S. Cl. 317—13        6 Claims

ABSTRACT OF THE DISCLOSURE

Means for limiting the short circuit current to a safe value in which the short circuit is detected by circuits which sense the unbalance in phase voltage and limit the maximum spread between the highest and lowest phase voltage.

The present invention relates to protective circuits and more particularly to an unbalanced load protective circuit for AC generators.

In most AC generating systems a line to neutral or line to line short is capable of fusing the wire internal in the generator before the normal trip time of a protective panel or fuse normally included in the system.

The present invention provides means for limiting the short circuit current to a safe value for the generator within the time of the system. The short circuit is detected by the circuits ability to sense the unbalance in the phase voltage and to limit the maximum unbalance in phase voltages. By limiting the maximum spread between the highest and lowest phase voltage caused by a short circuit, the output of the generator is limited to a safe value.

It is an object of the invention to provide a novel protection circuit for dynamoelectric machines.

Another object of the invention is to provide improved means for limiting short circuit currents in an AC generator system caused by a single phase fault.

Another object of the invention is to provide a novel protective system for AC generator systems.

A further object of the invention is to provide a novel protective circuit for an AC generating system that may be incorporated in the voltage regulator.

The above and other objects and features of the invention will appear more fully hereinafter from a consideration of the following description taken in connection with the accompanying drawing wherein one example is illustrated by way of example.

Figure 1:
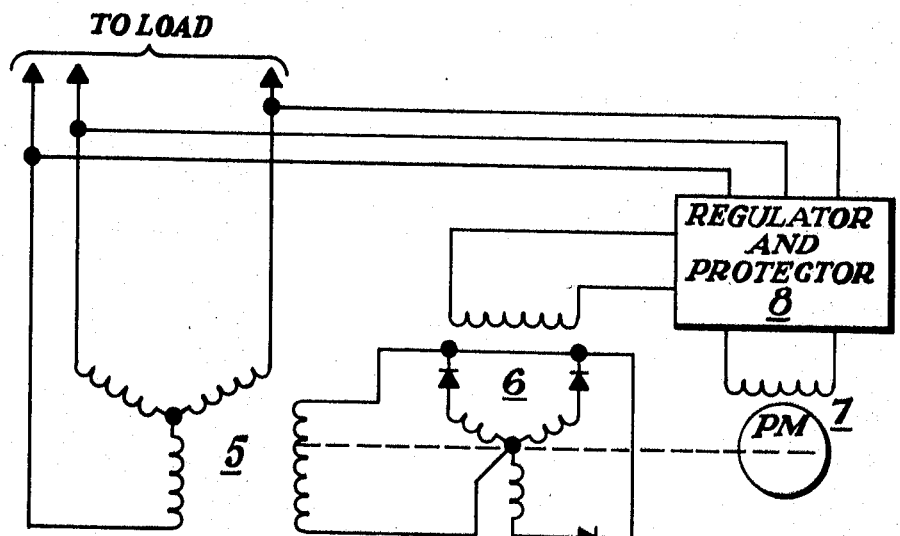
FIG. 1 is a schematic diagram of an AC generator system.

Referring now to FIG. 1 of the drawing, a generator system, which for the purpose of illustration is of the brushless type, includes a main generator 5, an excitor 6 and a PM generator 7. The PM generator 7 supplies the excitation for exciter 6 through a voltage regulator and protector 8. The regulator and protector 8 is connected to sense the output voltage of the main generator 5 and energizes the exciter in accordance with the output voltage.

Figure 2:
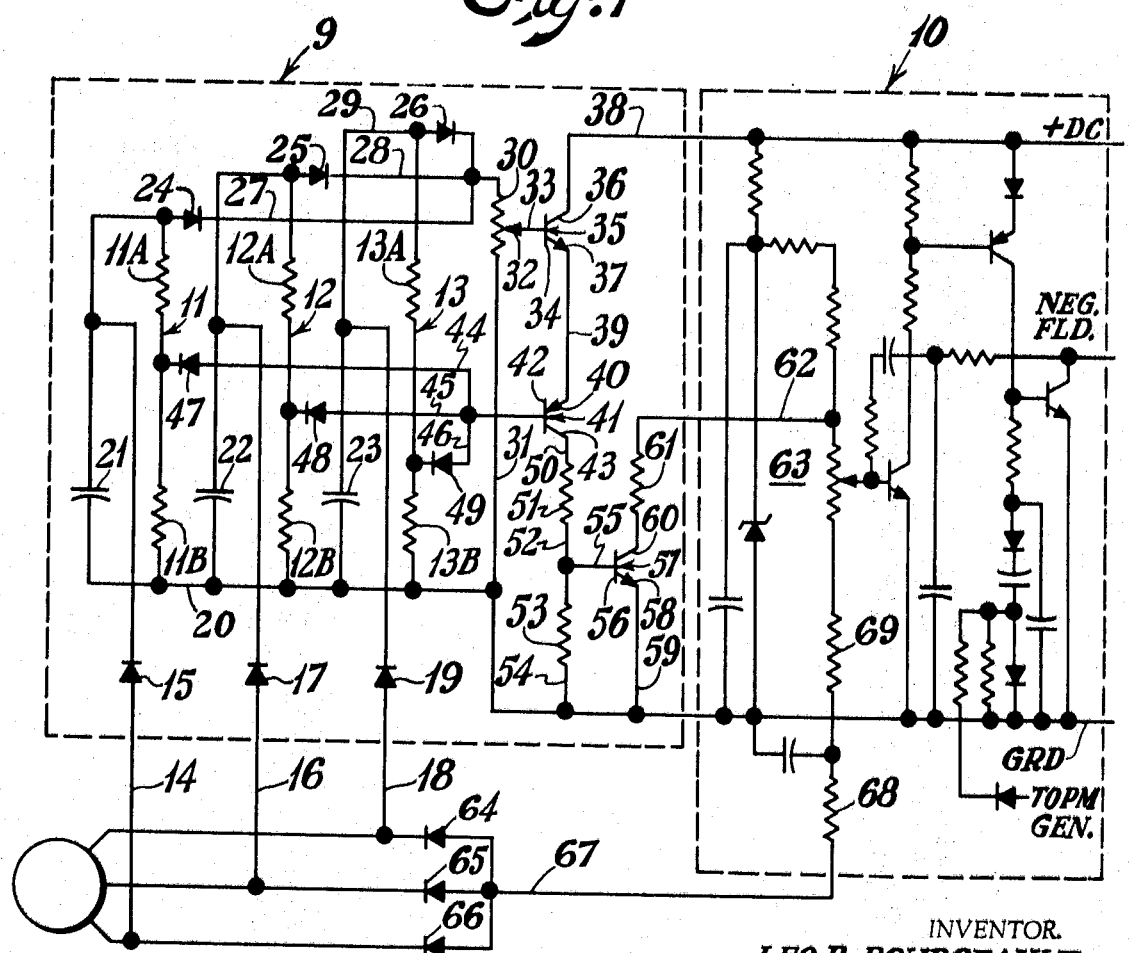
FIG. 2 is a schematic diagram of a protective system embodying the invention.

Referring now to FIG. 2, the regulator and protector 8 includes a protective circuit 9 and a regulator circuit 10. The circuit 9 includes resistor divider networks 11, 12, and 13. The network 11 includes resistors 11A and 11B, the network 12 includes resistors 12A and 12B and the network 13 resistors 13A and 13B. One end of the network 11 is connected to one phase of the output voltage of the generator 5 by conductor 14 and diode 15. In like manner the network 12 is connected to another phase of the output voltage of the generator 5 by conductor 16 and diode 17 and the network 13 is connected to the other phase by conductor 18 and diode 19. The other ends of the networks 11, 12, and 13 are connected to neutral conductor 20. Capacitors 21, 22, and 23 are connected across the respective networks 11, 12, and 13.

The conductors 14, 16, and 18 are also connected by diodes 24, 25, and 26 and conductors 27, 28, and 29 to one end of adjustable resistor 30. The other end of the resistor 30 is connected by conductor 31 to the conductor 20. The resistor 30 has a tap 32 connected by conductor 33 to base 34 of a transistor 35. The transistor 35 has an emitter 37 and collector 36. The collector 36 is connected to positive conductor 38 in the regulator section 10. The emitter 37 is connected by conductor 39 to emitter 40 of a transistor 41. The transistor 41 has a base 42 and collector 43. The base 42 of transistor 41 is connected by conductors 44, 45, and 46 and diodes 47, 48, and 49 to the junction between the resistors 11A and 11B, 12A and 12B, and 13A and 13B respective.

The collector 43 of the transistor 41 is connected by conductor 50 to one end of resistor 51. The other end of the resistor 51 is connected by conductor 52 to one end of a resistor 53. The other end of the resistor 53 is connected by conductor 54 to the conductor 20. Also, connected to the conductor 52 by a conductor 55 is base 56 of a transistor 57. The transistor 57 has a emitter 58 connected by conductor 59 to the conductor 20 and on collector 60 connected to one side of a resistor 61. The other side of the resistor 61 is connected by conductor 62 to voltage reference circuit 63 of the regulator setcion 10.

The output voltage is connected for sensing to the circuit 63 by diodes 64, 65, and 66, conductor 67 and resistors 68 and 69. The circuit 63 produces a signal in accordance with the output voltage of the generator to control the excitation current from the DC source. A detailed description of the regulator has been omitted for simplicity as other types of regulators could be used with the protection circuit 9.

In operation the generator phase voltages are half wave rectified and connected to filter capacitors and resistor divider networks. The filtered voltages are diode isolated and connected to emitter follower transistor 35 through resistor 30 which is an adjustment for the transistor 35's output voltage level. The diodes 47, 48, and 49 serve as circuit isolation and to connect the base 42 of the transistor 41 to the resistor divider circuits. The resistor 51 limits the base current for the transistor amplifier 57 and the resistor 53 is used for bias on the transistor 57.

When a short circuit occurs in one phase, the shorted phase will have a low voltage while the unshorted phases will be somewhat higher. The transistor 35 will follow the highest phase voltage. When the spread in the voltages reaches a predetermined value, the transistor 41 will be biased on and also the transistor 57. The transistor 57 is connected in a manner in the voltage regulator to cause it to reduce the field current in the generator which will reduce the generator output voltage. The lowered generator voltage will lower the transistor's 35 output voltage which in turn will increase the bias on transistor 41 and lower the output of the transistor 57 until a safe regulating point is reached. Hence, the circuit will override the normal voltage regulator and will now regulate the difference between the highest and lowest phases.

Although only one embodiment of the invention has been illustrated and described, various changes in the form and relative arrangement of the parts, which will now appear to those skilled in the art, may be made without departing from the scope of the invention.

What is claimed is:
1. A voltage regulator for a multi-phase generator for limiting line current to a safe value in case of a single-phase line fault, comprising:
   means connected to the line for detecting unbalance between phase voltages,
   means connected to the phase voltage detecting means for detecting a predetermined unbalance between the phase voltages, and
   regulating means connected to the last mentioned means and responsive thereto for controlling generator field current to prevent the unbalance between the phase voltages from exceeding the predetermined unbalance and to limit line current to a safe value in case of a single-phase fault.
2. The combination as set forth in claim 1 in which said circuit for sensing unbalance between the phase voltages is a voltage divider network connected between said phases.
3. The combination as set forth in claim 1 in which said means for detecting a predetermined unbalance includes a transistor responsive to the unbalance of said phases to provide a signal to said regulating means.
4. The combination as set forth in claim 2 in which said divider network is diode isolated.
5. The combination as set forth in claim 3 in which said transistor detects the greatest unbalance between phase voltages.
6. The combination as set forth in claim 2 in which said divider network includes resistors.

References Cited
UNITED STATES PATENTS

| | | | |
|---|---|---|---|
| 3,284,694 | 11/1966 | Roof et al. | 322—28 |
| 3,340,459 | 9/1967 | Fields et al. | 322—28 |
| 3,351,845 | 11/1967 | Roof et al. | 322—28 X |
| 3,184,644 | 5/1965 | Faglie | 317—27 X |
| 3,368,129 | 2/1968 | Chausse et al. | 317—27 X |

JAMES D. TRAMMELL, Primary Examiner

U.S. Cl. X.R.

317—20, 27, 33; 322—20